United States Patent [19]

Chainer et al.

[11] Patent Number: 5,793,554

[45] Date of Patent: *Aug. 11, 1998

[54] SELF-SERVOWRITING SYSTEM WITH DYNAMIC ERROR PROPAGATION REDUCTION

[75] Inventors: Timothy Chainer, Mahopac; Mark Delorman Schultz, Elmsford; Bucknell Chapman Webb, Ossining; Edward John Yarmchuk, Mahopac, all of N.Y.

[73] Assignee: International Business Machines Corporation, Armonk, N.Y.

[*] Notice: The term of this patent shall not extend beyond the expiration date of Pat. No. 5,659,436.

[21] Appl. No.: 677,148

[22] Filed: Jul. 9, 1996

[51] Int. Cl.[6] .................................................. G11B 5/596
[52] U.S. Cl. ............................................ 360/75; 360/77.08
[58] Field of Search ............................ 360/51, 75, 67, 360/77.03, 77.07, 77.01, 77.04, 78.04, 77.08; 318/568.22; 369/32, 44.14

[56] References Cited

U.S. PATENT DOCUMENTS

| | | | |
|---|---|---|---|
| 3,881,184 | 4/1975 | Koepcke et al. | 369/32 |
| 4,414,589 | 11/1983 | Oliver et al. | 360/77.07 |
| 4,563,058 | 1/1986 | Yardy | 364/44.14 |
| 4,912,576 | 3/1990 | Janz | 360/77.07 |
| 5,003,412 | 3/1991 | Bizjak et al. | 360/77.01 |
| 5,241,433 | 8/1993 | Anderson et al. | 360/77.04 |
| 5,444,583 | 8/1995 | Ehrlich et al. | 360/78.09 |
| 5,448,429 | 9/1995 | Cribbs et al. | 360/75 |
| 5,475,291 | 12/1995 | Yoshida et al. | 318/568.22 |
| 5,485,322 | 1/1996 | Chainer et al. | 360/51 |
| 5,541,784 | 7/1996 | Cribbs et al. | 360/75 |
| 5,570,247 | 10/1996 | Brown et al. | 360/75 |
| 5,612,833 | 3/1997 | Yarmchuk et al. | 360/75 |
| 5,659,436 | 8/1997 | Yarmchuk et al. | 360/75 |

FOREIGN PATENT DOCUMENTS

| | | |
|---|---|---|
| 715299 | 5/1996 | European Pat. Off. . |
| 61-170932 | 1/1986 | Japan . |
| 4-038778 | 2/1992 | Japan . |
| A-256 917 | 9/1995 | Taiwan . |
| WO94/11864 | 5/1994 | WIPO . |

OTHER PUBLICATIONS

Anonymous, Compensation Technique for External Vibration for Direct Access Storage Devices (DASD), Research Disclosure, May 1992, No. 33761, pp.375.
Elliot, P.J., Data Head Self Servowrite, IBM Technical Disclosure Bulletin, vol. 32, No. 9A, Feb. 1990, pp. 20–22.
Anonymous, Regenerative Clock Technique for Servo Track Writers, IBM Technical Disclosure Bulletin, vol. 33, No. 5, pp. 310–311., Oct. 1990.

*Primary Examiner*—Andrew L. Sniezek
*Assistant Examiner*—Patrick Wamsley
*Attorney, Agent, or Firm*—Ingrid M. Foerster; Monica D. Lee

[57] ABSTRACT

A self-servowriting system and method for implementation in a storage device such as a disk drive are described. Two problems associated with self-propagation are greater mechanical disturbances and the growth of errors during many thousands of servowriting steps. Error growth is attributable to the special properties of servo loops as applied to a repetitive self-propagation process. Greater resistance to mechanical disturbances and reduction in error growth are achieved, in part, by adjusting a step amplification factor, S, at the initiation of servowriting to within desired parameters. However, S is known to vary with movement of the head in a direction transverse to the direction of the tracks. This problem is addressed by the present invention, wherein S is determined at a plurality of transverse transducer positions. S is dependent upon the closed loop response of the servo system C and upon a set of step-to-step correction factors f. S is therefore determined by monitoring an indicium of S such as C, and is adjusted by adjusting either C or f to provide a value of S which falls within an acceptable range of values. Determination of S is scheduled to occur at predefined intervals. The intervals may be fixed or adjusted adaptively based upon the measured variation of S with transducer position.

52 Claims, 8 Drawing Sheets

*FIG. 6B*

SELF-SERVOWRITING SYSTEM WITH DYNAMIC ERROR PROPAGATION REDUCTION

BACKGROUND OF THE INVENTION

This application is related to U.S. patent application Ser. No. 08/349,028, now U.S. Pat. No. 5,612,833 filed on Dec. 2, 1994, from which continuation in part U.S. patent application Ser. No. 08/405,261 now U.S. Pat. No. 5,659,436 stems; U.S. patent application Ser. No. 08/348,773, now abandoned filed on Dec. 1, 1994, from which one divisional application stems; and U.S. patent application Ser. No. 08/028,044, now abandoned filed on Mar. 8, 1993, from which three divisional applications stem, one having issued on Jan. 16, 1996 as U.S. Pat. No. 5,485,322; all commonly assigned herewith and expressly incorporated by reference.

FIELD OF THE INVENTION

The invention relates generally to data storage devices wherein data access is achieved by positioning a transducer relative to a storage medium, positioning being controlled by a servo system in response to positional information. More particularly it relates to an improved disk drive apparatus and method for writing positional information to the medium.

Increased levels of storage capacity in storage devices such as hard disk drives (optical or magnetic, for example) and removable storage media (removable disk or removable tape drives, for example) are a direct result of the higher track densities possible with voice-coil and other types of servo positioners as well as the ability to read and write narrower tracks by using, for example, magnetoresistive (MR) head technology. Head positioning is accurately controlled using positional information stored on the storage media itself. In a disk drive, for example, the positioning or "servo" information may be stored on a dedicated disk surface or may be embedded in each data surface.

Conventional servo-patterns in an "embedded servo" disk drive architecture typically comprise short bursts of a constant frequency signal, very precisely offset to either side of a data track's center line. The bursts precede data regions of the track and are used to align a head with respect to the track center. Staying on track center is required during both reading and writing for accurate data storage and retrieval. Since there can be, for example, sixty or more data regions per track, that same number of servo data areas are preferably distributed around a track to provide means for a head to follow the track's center line as the disk rotates, even when the track is out of round, e.g., as a result of spindle wobble, disk slip and/or thermal expansion. As technology advances to provide smaller disk drives and increased track densities, the accurate placement of servo data must also increase proportionately.

Servo-data are conventionally written by costly dedicated servowriting equipment external to the disk drive equipped with large granite blocks for stably supporting the drive and quieting external vibrational effects. An auxiliary clock head is inserted onto the surface of the recording disk to write a reference timing pattern, and an external head/arm assembly is used to precisely position the transducer. The positioner includes a very accurate lead screw and a laser displacement measurement device for positional feedback. Servotracks are written on the media of a head disk assembly (HDA) with a specialized servowriter instrument. Laser positioning feedback is used in such instruments to read the actual physical position of a recording head used to write the servotracks.

A disadvantage of servo writers such as those described is that they require a clean room environment, as the disk and heads will be exposed to the environment to allow the access of the external head and actuator. Additionally, it is becoming more and more difficult for such servowriters to invade the internal environment of a HDA for servowriting because the HDAs themselves are exceedingly small and depend on their covers and castings to be in place for proper operation. Some HDAs, for instance, are the size and thickness of a plastic credit card.

In view of these challenges, a disk drive able to perform self-servo writing would be tremendously advantageous. However, this approach presents a new set of challenges. Specifically, self-servowriting systems are more prone to mechanical disturbances. Moreover, because of the interdependency of propagation tracks in self-servowriting, track shape errors introduced by mechanical disturbances and other factors may be amplified from one track to the next when writing the propagation tracks. Thus a self-servowriting system must be able to write servopatterns with a high degree of accuracy to meet the stringent requirements of high density disk drives.

Servopatterns consist of bursts of transitions located at intervals around the disk surface. In self-propagation, the radial position signal that is used to servo-control the actuator is derived from measurements of the readback amplitude of patterns that were written during a previous step of the servowrite process. That is, the burst edges of a written track comprise a set of points defining a track shape that the servo controller will attempt to follow when writing the next track. Thus, errors in the transducer position during burst writing appear as distortions away from a desired circular track shape. The servo controller causes the actuator to follow the resulting non-circular trajectory in a next burst writing step, so that the new bursts are written at locations reflecting (via the closed-loop response of the servo loop) the errors present in the preceding step, as well as in the present step. Consequently, each step in the process carries a "memory" of all preceding track shape errors. This "memory" depends on the particular closed-loop response of the servo loop.

A primary requirement in disk files is that each track be separated at all points by some minimum spacing from adjacent tracks. This requirement ensures that neighboring track information is not detected on readback, resulting in data read errors, and more importantly, that adjacent track data will never be excessively overlapped during writing, potentially resulting in permanent loss of user data. In other words, the detailed shape of each track relative to its neighbors must be considered, not just the track to track distance averaged around the whole disk. Radial separation between adjacent track locations is determined by the product servopattern written on each track and at each angular location around the disk, since the servo-control of the actuator during actual file operation is capable of following distortions from perfect circularity and will produce misshapen data tracks.

A consideration in setting the minimum allowable spacing for self propagation schemes is the existence of random fluctuations about the desired track location resulting from mechanical disturbances during actual file operation. Effects that result in track shape errors in a self-servowriting system include, for example, random mechanical motion and modulation in the width of the written track that results from variations in the properties of the recording medium or in the flying height of the transducer. Random mechanical motion can be lowered using a high gain servo loop, but this leads to error compounding. Random magnetic modulation variations reduce the pattern accuracy of all servowriters, but error compounding in self-propagation can amplify this further. Uncontrolled growth of such errors can lead to excessive track non-circularity, and in some cases, may even lead to exponential growth of errors, exceeding all error margins and causing the self-propagation process to fail.

One of the largest sources of mechanical disturbance is the turbulent wind generated by the spinning disks blowing against the actuator. The total amount of fluctuation, referred to as track misregistration or TMR, defines a relevant scale for judging the required accuracy of servopattern placement. If servopattern placement errors are roughly equal to or greater than the TMR, then a substantial fraction of the track spacing margin will be required as compensation and the total disk file data capacity will accordingly be reduced. In this instance, reduction in servopattern errors may substantially increase file capacity.

Consequently, self-servowriting systems must provide a means for accurately writing servopatterns while controlling the propagation of track shape errors.

One self-servo writing method is disclosed in U.S. Pat. No. 4,414,589 to Oliver et al., which teaches optimization of track spacing. Head positioning is achieved in the following manner. First, one of the moving read/write heads is positioned at a first stop limit in the range of movement of the positioning means. The head is used to write a first reference track. A predetermined percentage of amplitude reduction, X%, is selected that empirically corresponds to the desired average track density. The moving head reads the first reference track and is displaced away from the first stop limit until the amplitude of the signal from the first reference track is reduced to X% of its original amplitude. A second reference track is then written by the head at the new location, read, and the head is again displaced in the same direction until the amplitude of signal from the second reference track is reduced to X% of its original value. The process is continued until the disc is filled with reference tracks. The average track density is checked to insure that it is within a predetermined acceptable range of the desired average track density. If the average track density is too high or too low, the disk is erased, the X% value is appropriately lowered or increased, and the process is repeated. If the average track density is within the predetermined acceptable range, the desired reduction rate X% for a given average track density has been determined and the servo writer may then proceed to the servo writing steps.

U.S. Pat. Nos. 4,912,576 to Janz and 5,448,429 to Cribbs et al. describe methods for writing a servo-pattern with a disk drive's own pair of transducers. Three types of servo-patterns are used to generate three-phase signals that provide a difference signal having a slope directly proportional to velocity. Janz observes that the signal level from a transducer is a measure of its alignment with a particular pattern recorded on the disk. For example, if the flux gap sweeps only forty percent of a pattern, then the read voltage will be forty percent of the voltage maximum obtainable when the transducer is aligned dead-center with the pattern. Janz uses this phenomenon to position the heads by straddling two of three offset and staggered patterns along a centerline path intended for data tracks. In a preferred process, Janz describes a dedicated servo architecture wherein one side of a disk is reserved for servo and the other side for data. The disk drive includes two transducers on opposite surfaces that share a common actuator. To format an erased disk for data initialization, a first phase servo is written on the servo side at an outer edge. The transducers are then moved-in radially one half of a track, as indicated by the first phase servotrack amplitude, and a first data-track is recorded on the data side. The transducers are again moved radially inward one half of a track, this time as indicated by the first data-track amplitude, and a second phase servotrack is recorded on the servo side. This sequence is repeated until both surfaces are entirely written. If too few or too many tracks are written, the disk is reformatted with a slight adjustment to the step width, as determined by the track count. Once the disk drive has been formatted with an entire compliment of properly spaced servotracks, the data-tracks are erased in preparation for receiving user data. Unfortunately, the method described by Janz requires a dedicated disk surface for servotracks and two heads working in tandem. Moreover, transducer flying height variations, spindle runout, and media inconsistencies can corrupt radial position determinations that rely on a simple reading of off-track read signal amplitudes. Prior art methods do not address these issues and are therefore inadequate for high performance disk drives applications.

Cribbs et al. teaches a hard disk drive system with self-servowriting capability comprising a rotating recording disk, transducer in communication with the disk surface, servo-actuator means for radially sweeping the transducer over the surface, a variable gain read amplifier (VGA) coupled to the transducer, an analog to digital converter (ADC) coupled to the VGA, an erase frequency oscillator coupled to the transducer for DC erasing of the disk surface, a memory for storing digital outputs appearing at the ADC, and a controller for signaling the servo-actuator to move to such radial positions that result in transducer read amplitudes that are a percentage of previous read amplitudes represent in the digital memory.

The prior art fails to solve the problem of random mechanical motion resulting in reduced disk file capacity, or to address the relationship between random mechanical motion and error compounding. It also fails to address the relationship between magnetic write width modulation and error compounding, or even error compounding viewed independently.

Accordingly, what is needed is a self-servowriting disk file which overcomes the preceding problems to provide a highly accurate and cost effective positioning system.

SUMMARY OF THE INVENTION

The present invention is a self-servowriting system and method for implementation in a storage device including a storage medium, a transducer, and a servo system for positioning the transducer relative to the storage medium. Two problems associated with self-propagation are greater mechanical disturbances and the growth of errors during many thousands of servowriting steps. Error growth is attributable to the special properties of servo loops as applied to a repetitive self-propagation process. Greater resistance to mechanical disturbances and reduction in error growth are achieved, in part, by adjusting a step amplification factor, S, at the initiation of servowriting to within desired parameters. However, S is known to vary with movement of the head in a direction transverse to the direction of the tracks. This problem is addressed by the present invention, wherein S is determined at a plurality of transverse transducer positions. S is dependent upon the closed loop response of the servo system C and upon a set of step-to-step correction factors f. S is therefore determined by monitoring an indicium of S such as C, and is adjusted by adjusting either C or f to provide a value of S which falls within an acceptable range of values. Determination of S is scheduled to occur at predefined intervals. The intervals may be fixed or adjusted adaptively based upon the measured variation of S with transducer position.

DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

Disclosed herein are improvements to a self-servowriting apparatus and method such as that described in U.S. patent application Ser. Nos. 08/349,028 and 08/405,261 now U.S. Pat. Nos. 5,612,833 and 5,659,436. Accordingly, the underlying inventions of those applications will be described to set the stage for the proposed modifications.

I. Self-Servowriting Disk Drives

Figure 1:
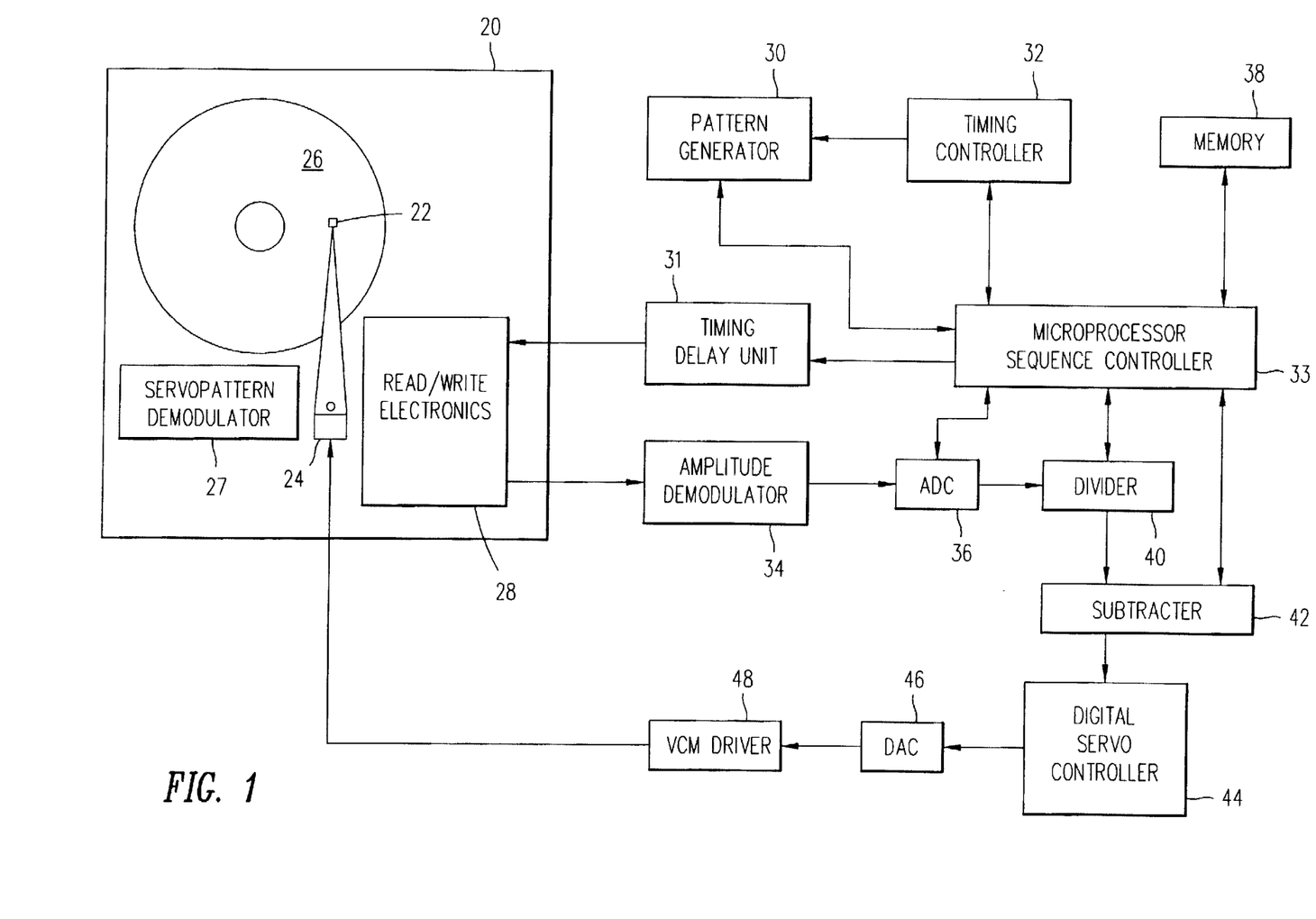
FIG. 1 is a block diagram of a self-servowriting system suitable for practicing the present invention.

FIG. 1 provides the major components of the preferred self-propagating disk drive servo-writing system for practicing the present invention. A disk drive 20 comprises a recording transducer 22, voice coil actuator 24, recording medium 26, servopattern demodulator 27, and read/write control electronics 28. The normal operating functions of these elements are well understood in the disk drive industry. The disk drive 20 is connected to a time delay unit 31 in series with a pattern generator 30, which is clocked by a timing controller 32. The timing controller 32, under the direction of a microprocessor sequence controller 33, allows bursts of magnetic transitions to be recorded at precisely controlled times. For the purposes of radial self-propagation burst writing and detection, the timing controller comprises, for example, the AM9513A system timing controller manufactured by Advanced Micro Devices Corporation of Sunnyvale, Calif., which is simply synchronized to a once per revolution index timing mark. It shall be understood, however, that the writing of actual product servopatterns requires much tighter timing control, particularly when writing the servo identification fields and whenever writing phase encoded servo patterns. Methods for achieving such precise timing control using the internal disk file recording transducer, in a manner consistent with self-propagation are described in U.S. Pat. No. 5,485,322 and are expressly incorporated herein by reference.

A readback signal from the read/write electronics 28 is provided to an amplitude demodulator circuit 34, and its amplitude is converted to a digital value by an analog-to-digital converter (ADC) 36 at times determined by timing controller 32 acting in concert with the sequence controller 33 (e.g. when the head is passing over a burst pattern on the disk). The digitized output of ADC 36 is provided to a divider 40. The divider 40 divides the signal by a digitized normalization value stored in memory 38. The output of divider 42 is provided to a subtractor 40, which subtracts the digital input value from a reference value retrieved from memory 38 to create the position error signal (PES). These functions are described in greater detail subsequently.

The PES is provided to a digital servo controller 44 which converts it into an appropriate corrective control signal. The corrective signal is then converted to analog form by a digital to analog converter (DAC) 46, and is further amplified and converted to a current by a VCM driver 48. The driver current is applied to voice coil actuator 24 in the disk file causing recording transducer 22 to move approximately radially with respect to recording medium 26.

Sequence controller 33 provides computation capabilities for general use in determining modifications to the stored reference table values, for determining appropriate delay settings to be applied to timing delay unit 31, and for producing control signals for pattern generator 30. Preferably, the functions of divider 40, subtractor 42, and digital servo controller 44 are all achieved through the appropriate programming of sequence controller 33.

Figure 2:
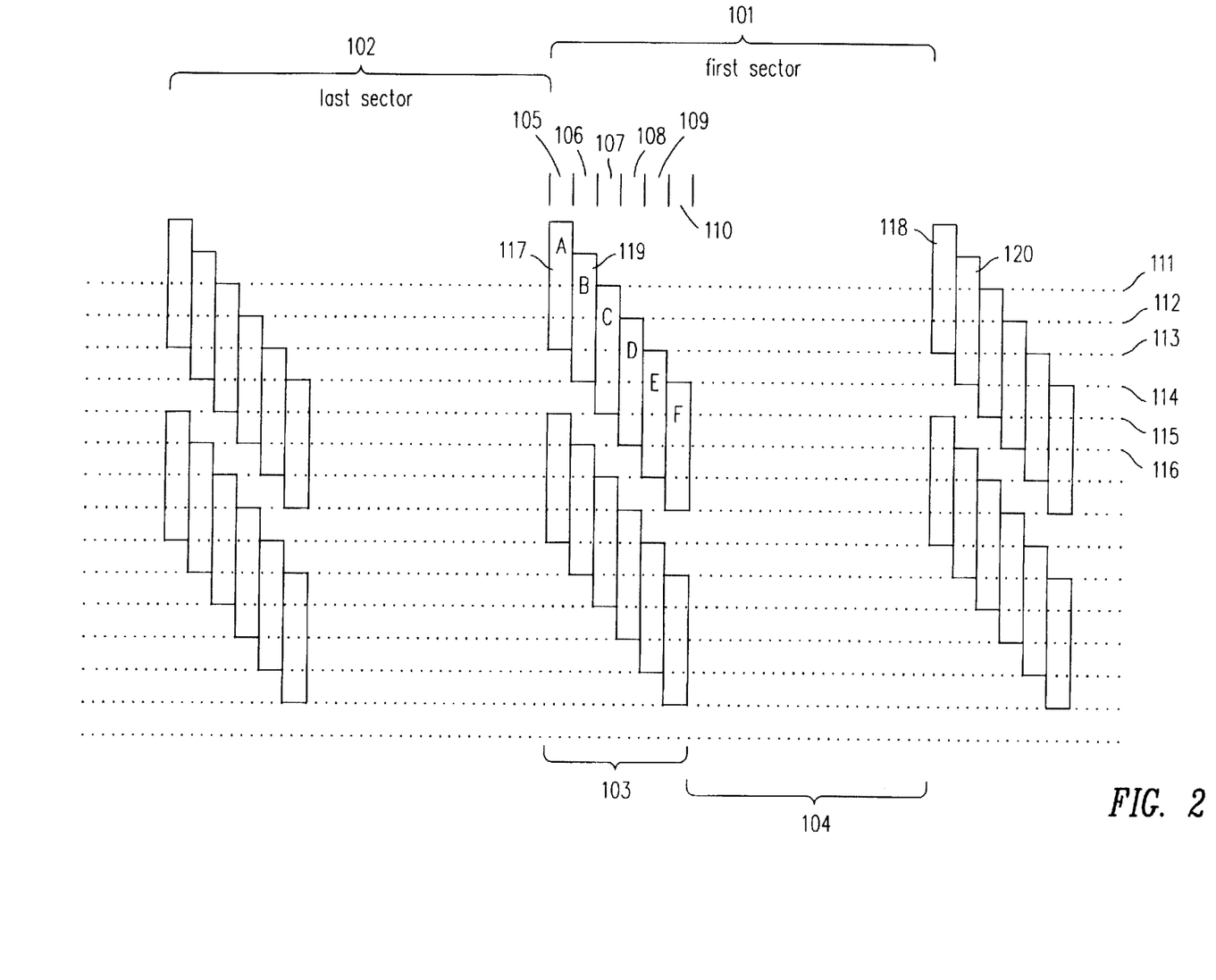
FIG. 2 is a diagram illustrating the relationship between propagation tracks, disk sectors and propagation bursts in a self-servowriting system suitable for practicing the present invention.

FIG. 2 shows a diagram of a portion of recording medium 26 including a number of propagation tracks represented by dotted lines 111, 112, 113, etc. Each track comprises a number of sectors, with a first sector 101 typically coming immediately after the disk rotation index as determined, for example, by an index pulse from the disk spindle motor driver or from the timing controller. Each sector is further divided into two regions: a first region 103 containing bursts comprising, for example, a recognizable series of magnetic transitions, and a second region 104. The propagation bursts define propagation tracks for use in accurately positioning the head to write product servopatterns. Region 104 is reserved for use by the precision timing propagation system and for actual product servopattern, which includes, for example, sector ID fields and a pattern such as an amplitude burst or phase encoded pattern. Preferably, propagation burst areas 103 will be overwritten with user data after servowriting. All of region 104 except for the part containing the product servopattern will also be overwritten with user data.

Each propagation burst region 103 is further divided into a number of slots 105–110 within which propagation bursts (A,B,C,D,E, and F) are written. The propagation track pitch in FIG. 2 is preferably one-quarter of the assigned data track pitch. That is, if the first user data track is centered on propagation track 112, the next data track will be centered on propagation track 116 providing a ¼ track separation between the propagation tracks 113 and 114, and so on across the disk. The preferred propagation burst pattern consists of a repeating sequence of 6 bursts as shown in FIG. 2. This is useful because the bursts, which are nonoverlapping in the radial direction, allow the recording transducer to radially back up and check previously written bursts.

A typical number of sectors is 120 and a typical disk rotation rate is 5400 rpm, translating into about 92 microseconds per sector. A typical slot time, i.e., the duration of time for the slot to pass a fixed point of reference in the circumferential direction, is 7 microseconds. The slot time is preferably longer than the duration of a product servopattern burst, since longer bursts extend filtering time during demodulation. More filtering time results in a higher signal to noise ratio, which simplifies some of the digital servo loop computation, particularly with regard to determining derivative or velocity related servo terms. Moreover, there is no loss of user data space with expanded propagation bursts since they will be overwritten later. However, it will be understood that shorter burst times may be used if more time is needed for timing marks and product servopattern writing to regions 104.

Figure 3A:
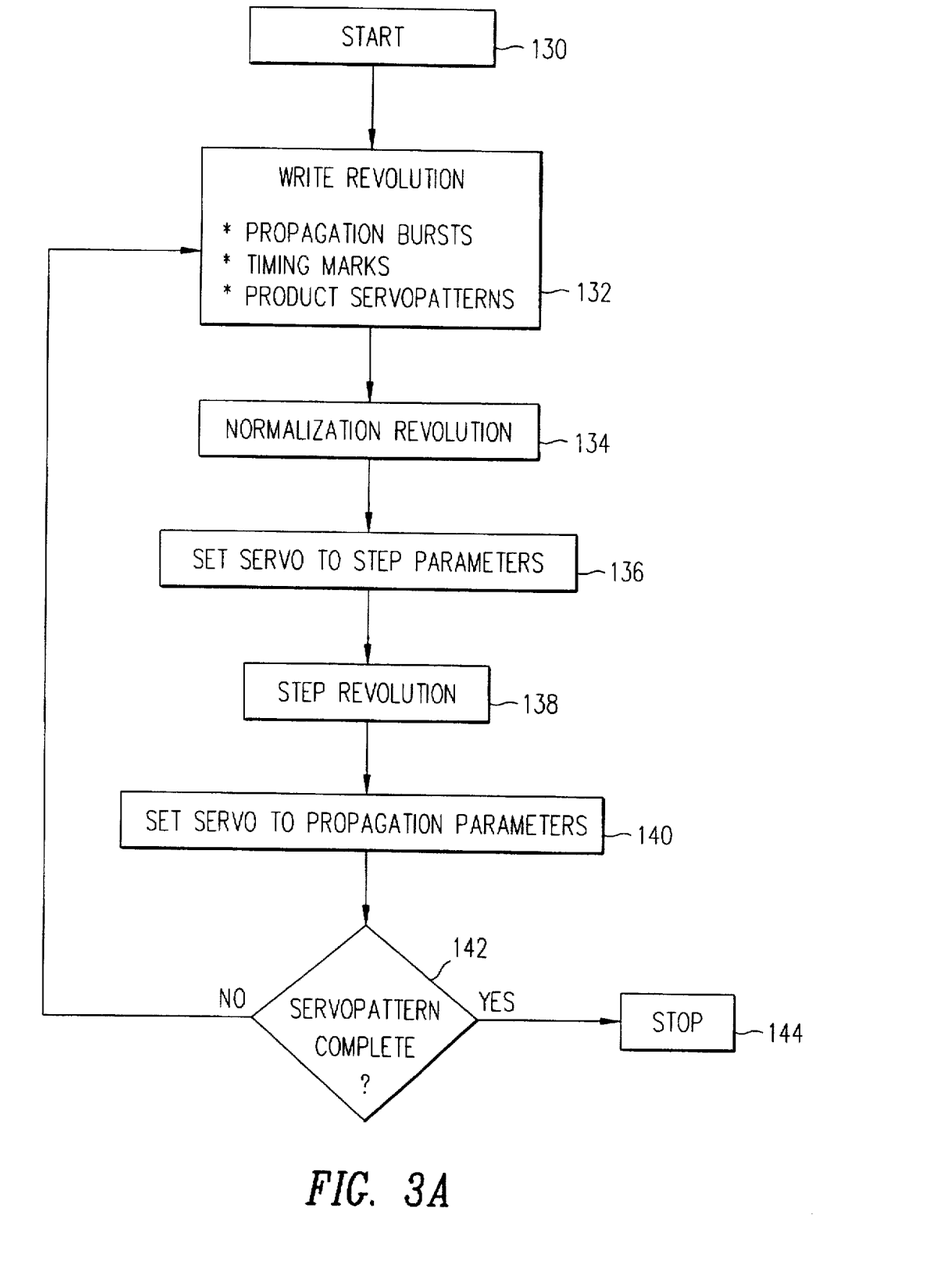
FIG. 3A is a flow diagram of the basic process steps for a self-servowriting system suitable for practicing the present invention.

Referring now to FIG. 3A, an iterative self-propagation process is shown. In a first step 130, the recording transducer is located at either the outermost accessible track (OD) or innermost accessible track (ID) of the disk file with the actuator being pushed against a physical stop to lock it against mechanical disturbances. In a next step 132, a first propagation track 111 (FIG. 2) is written with A bursts in the first slot of each propagation burst region. Also, the first portion of the product servopattern is written within region 104 of each sector together with the precision timing marks. These preferably occupy only a small portion at the beginning of region 104 on the same surface as the propagation burst patterns and are written during the same revolution of the disk. If other recording surfaces are to be written within a stack of disks, these are preferably written next with product servopatterns (but not timing marks) in successive disk rotations by switching the write electronics to select each recording transducer in turn. The first revolution, or series of revolutions for multiple disks, is referred to as a write revolution.

The next revolution of the disk is referred to as a normalization revolution and is indicated as step 134 in FIG. 3A. In this step, the head is in read mode and sequence controller 33 signals the ADC 36 to sample and digitize the demodulated readback signal during the first slot of each sector, i.e., the "A burst". These digital sample values are stored in a propagation burst amplitude normalization table in memory 38. (See table 360 in FIG. 3B). An improved normalization method is disclosed in related application Ser. No. 08/677,144, filed herewith.

After all sectors have been read in the normalization revolution but before the first propagation burst region 103 of the next revolution, parameters used in the servo control voltage calculation are set equal to predetermined values ("step parameters") that provide rapid motion and settling. This is shown as step 136 in FIG. 3A. As an example, servo parameters similar to those used in the operation of the disk file would work well as step parameters.

Figure 3B:
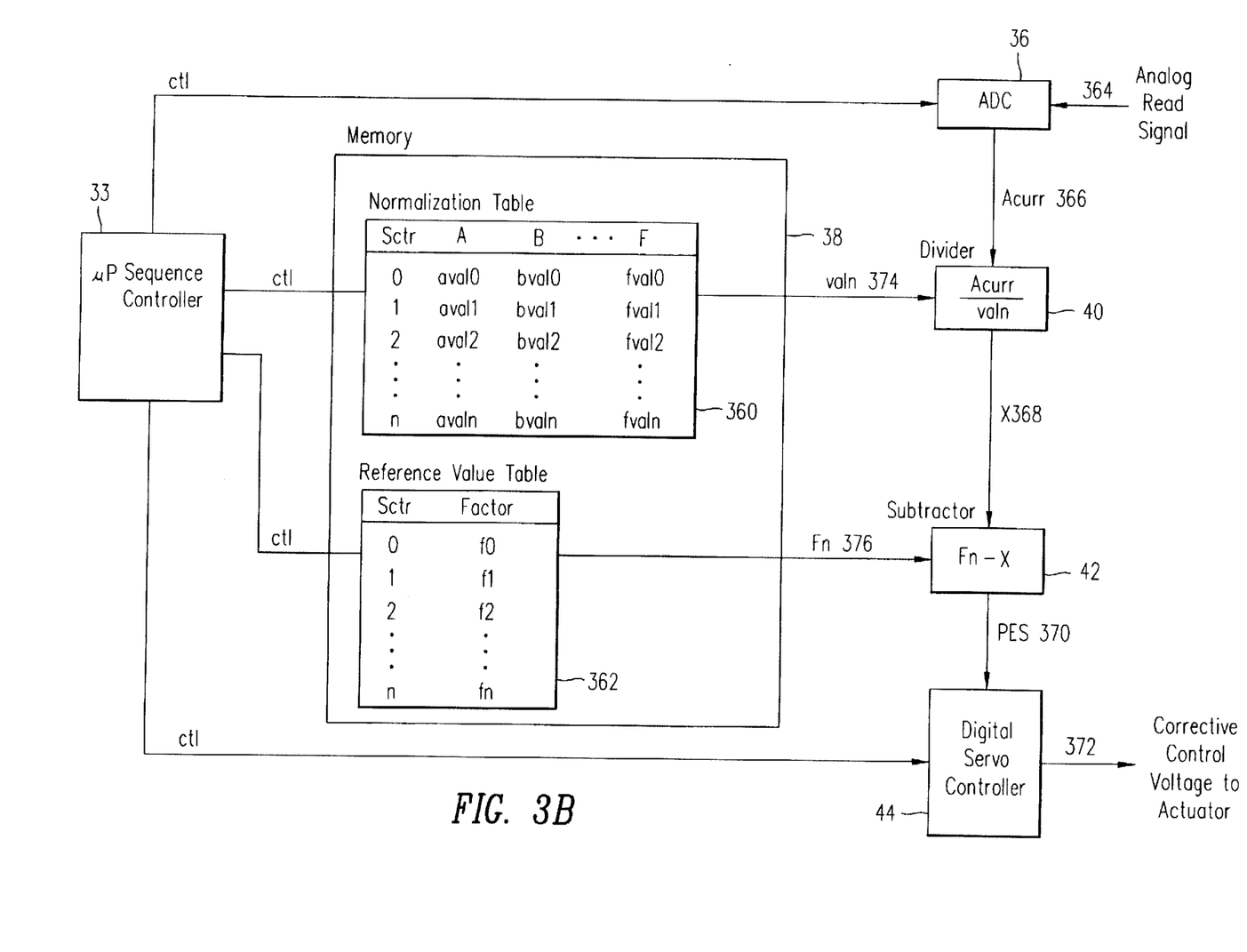
FIG. 3B is a block diagram illustrating the elements of the self-servowriting system involved in generation of a position error signal during step propagation.

The next revolution of the disk is referred to as a "step revolution" and is shown as step 138. Some of the key servowriting elements involved in the execution of this step are shown in FIG. 3B. Referring to both FIGS. 3A and 3B, at the beginning of the step revolution 138, memory 38 contains not only the normalization table 360, but also a preloaded reference value table 362 holding a list of reference values, f0–fn, for each of the sectors, 0–n. Initially, the reference values, f0–fn, are all assigned to a same value representative of the anticipated amplitude reduction of the normalized readback signal if sensed from the next propagation track 112. During the step revolution 138, sequence controller 33 steps through the normalization table 360 and the reference value table 362 sector by sector, routing an appropriate normalization value, valn 374, to the divider 40 and a corresponding reference value, Fn 376, to subtractor 42. During the first iteration of the servowriting sequence, the set of normalization values obtained from the A bursts, aval0–avaln, will be used. Concurrently, ADC 36 continues to digitize the readback signal 364 from the A bursts under the sequence controller's 33 direction, producing readback signal Acurr 366 having an amplitude of some magnitude. The divider 40 receives Acurr 366, divides it by the normalization value, valn 374, and provides the result, a propagation burst fractional amplitude X 368, to subtractor 42. The subtractor 42, in turn, receives X 368, and subtracts it from the reference value, Fn 376. The result provides a position error signal, PES 370, which will be available at the subtractor 42 output when recording transducer 22 reaches the end of each propagation burst region 103. At this time, sequence controller 33 signals digital servo controller 44 to read the PES 370 and to compute a new control voltage setting. The control voltage 372, adjusted after each sector, drives actuator 24 in a direction that reduces the PES 370, i.e., toward propagation track 112.

The actuator 24 typically settles onto the next propagation track 112 in about one quarter of a disk revolution. At that time, in a next step 140 of FIG. 3A, the parameters of the servo control voltage calculation are assigned a different set of parameters, i.e. "propagation parameters". The propagation parameters are tailored to provide rejection of mechanical disturbances without amplification of track shape errors. The manner in which they are determined will be described subsequently. Even though the step to the next propagation track takes less than a full revolution, it simplifies matters to allow the revolution to complete before writing the next set of bursts.

At this point only a single propagation track has been written so the result of a decision step 142 comparing the number of data tracks written with the total number of tracks to be written is necessarily negative and the process returns to write revolution step 132. In this second write revolution, the sequence controller 33 signals pattern generator 30 to write bursts of transitions, B, in the second slot of each sector. As before, precision timing marks and product servopattern are written in regions 104 on the same recording surface, and only product servopattern on the remaining recording surfaces. Throughout this write revolution, ADC 36 continues to digitize the A bursts and servo controller 44 maintains actuator 24 in a position such that transducer 22 stays close to the desired location of track 112. The PES values obtained during this write revolution are recorded in a table in memory 38 for later use in calculating new reference values.

The next revolution is again a normalization revolution, step 134. In this iteration, the ADC 36 digitizes both the A & B burst amplitudes, storing the B burst amplitudes in the normalization table 360. Meanwhile, the servo loop continues to track follow using PES values computed from the A burst amplitudes, the stored A burst normalization values, and the stored reference values. Preferably, new reference values are also computed during this revolution. Each new table value is set equal to a nominal average reference value determined previously to be appropriate for the desired average track spacing in this region of the disk, plus a correction value. The correction value may comprise, for example, a predetermined fraction of the previously stored PES value for the corresponding sector obtained during the preceding write operation. Alternatively, it is computed using a digital filtering algorithm which is dependent on the closed loop transfer function of the servo loop, as described in the referenced co-pending applications. The algorithm is applied to the entire set of PES values stored during the preceding write revolution. Preferably, corrective value calculations are initiated during the write revolution 132 and completed sector by sector during the step revolution 138, updating the reference value table just prior to computation of the control voltage.

Switching now to the B bursts for PES computations, the process repeats, i.e., another step revolution is executed (step 138) wherein transducer 22 steps to the next propagation track, followed by a write revolution, step 132, in which C bursts, timing marks and product servopatterns are written. This continues (with A bursts following F bursts) until the desired number of data tracks have been written, resulting in a yes answer at decision step 142 and terminating the process at step 144.

Figure 4A:
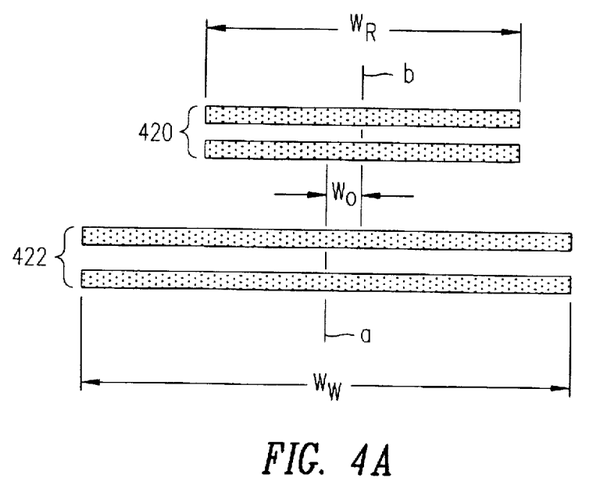
FIG. 4A shows the relative offsets of the read and write elements in a dual element head suitable for practicing the present invention.
Figure 4B:
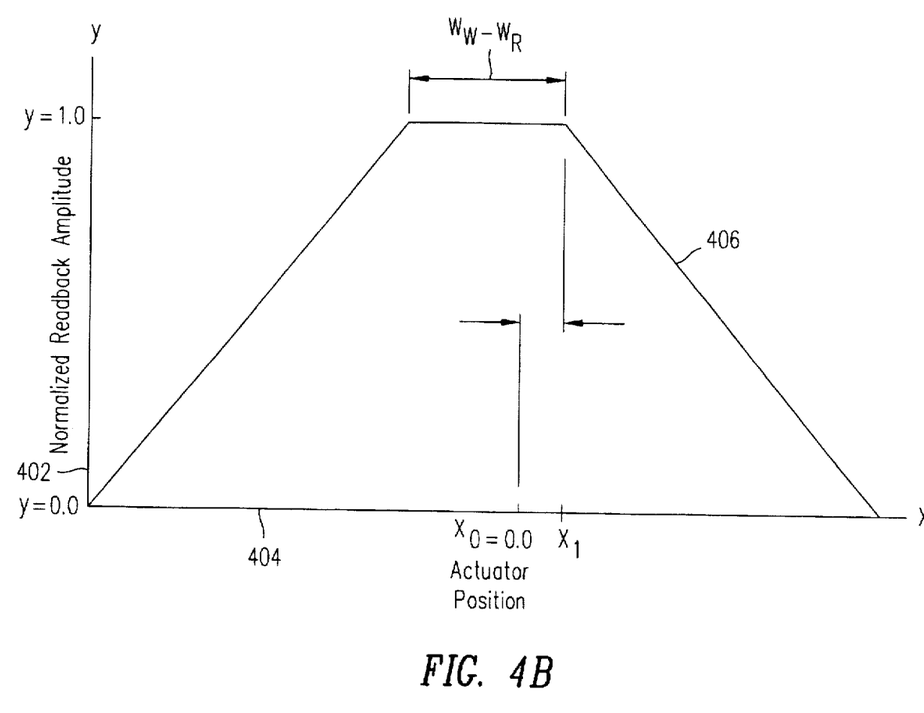
FIG. 4B is a graph illustrating a variation in readback signal amplitude as the actuator changes position across the disk in a self-servowriting system suitable for practicing the present invention.

In the discussion so far, it has been assumed that the recording read transducer and write transducer are one and the same, as in the typical inductive read/write element commonly used. Relatively recently, however, "dual element" transducers employing separate read and write elements such as magneto-resistive (MR) transducers have come into use, and require special attention with regard to the determination and control of propagation track spacing by means of nominal average reference value settings. FIG. 4A is a representation of an MR transducer wherein the read and write elements, 420, 422 have different widths, Wr and Ww, respectively, and a relative offset, Wo, between their respective central axes, a and b. FIG. 4B graphically represents a variation in the normalized readback amplitude from the read element 420, and the effect of the head offsets. Readback amplitude is indicated along the y-axis 402, with change in the position of the actuator indicated by the x-axis 404. The actuator position Xo=0.0 corresponds to the actuator position during a write operation. The flat portion of curve 406 represents the range of actuator movement in which the read element is radially aligned inside the written pattern to produce the best readback signal, and is equal to Ww–Wr as indicated.

As should be apparent from FIGS. 4A and 4B, the actuator movement required to reach a particular level of amplitude reduction depends on read element width, write element width, relative offset, and direction of motion. It is desirable, however, that the propagation track spacing be determined only by the read and write element widths, and not by head offset, since the apparent offset of the heads in a rotary actuator disk drive changes as the actuator sweeps from the outermost to the innermost track in a disk file. That is, the spatial separation of the read and write elements along the actuator arm direction leads to different projected locations of the read and write elements along the arc defined by the actuator arm motion. Dependency on read to write element offset may be eliminated in a manner which requires no prior knowledge of the precise geometry of the head and which can be achieved solely through measurements of readback amplitudes, as described in co-pending application Ser. No. 08/349,028 now U.S. Pat. No. 5,612,833. But for completeness, this approach will be described next with reference to FIG. 5.

Figure 5:
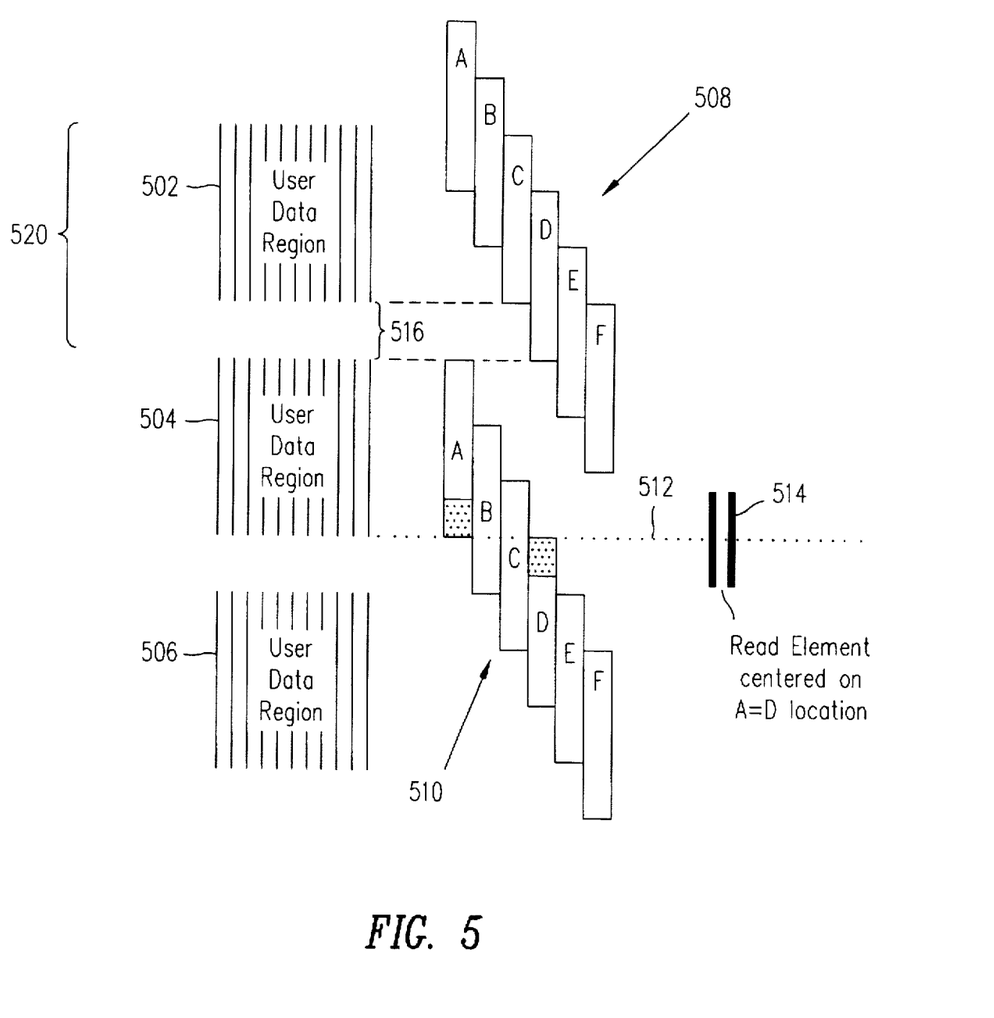
FIG. 5 illustrates the relative locations of the bursts in a six-burst propagation pattern suitable for practicing the present invention.

FIG. 5 illustrates the manner in which a six burst propagation burst region is used to write data tracks during self-servowriting. Each propagation burst (A–F) is radially displaced from an adjacent burst by a step comprising ¼ of the desired data track pitch. Track pitch 520 comprises the write element width (which determines the width of the data track) plus the desired radial distance or separation 516 between adjacent data tracks 502, 504. The radial track separation 516 should be sufficient to prevent accidental overwrite of adjacent tracks during a track write operation, as previously discussed. Since the bursts are radially spaced by ¼ of the desired track pitch, the write head is first aligned with burst A when writing data track 504. Next, the write head is aligned with a burst four steps or propagation tracks away, which in this case is burst E, when writing the next data track 506.

Pairs of burst patterns that are radially separated from one another by three ¼ track steps line up along a common edge. For example, propagation bursts A and D share a common edge along dotted line 512. Burst patterns 508, 510 are relatively positioned to preserve this relationship. For example, burst D of pattern 508 and burst A of pattern 510 are also radially aligned along a common edge.

If the read element 514 is positioned with respect to burst pattern 510 so that the normalized readback amplitude from burst A equals the normalized readback amplitude from burst D (the A=D position) then the relative normalized signal is 0.5 if the edges line up, greater than 0.5 if the edges overlap, and less than 0.5 if the edges have space between. Thus, the relative normalized signal at the A=D position may be used as an indicator of whether the propagation track pitch is too small or too large, and track pitch can be corrected by using this relative signal to adjust the nominal average reference value used to calculate reference values during propagation. If normalized readback amplitude varies linearly with position (a fairly good approximation, as shown in FIG. 4B), the adjustment in the nominal average reference value can be computed from the measured relative normalized signal at the A=D position.

The relationship may be better understood by noting that a change in nominal average reference value by an amount r results in a change in the relative normalized signal at the A=D position of 3r/2, since each of the three steps, A to B, B to C, and C to D, contributes a spacing change equal to r, and these changes are shared equally by A and D. The nominal average reference level should therefore be adjusted by an amount equal to ⅔ of the deviation of the relative normalized signal at the A=D position from its desired level.

Figure 6A:
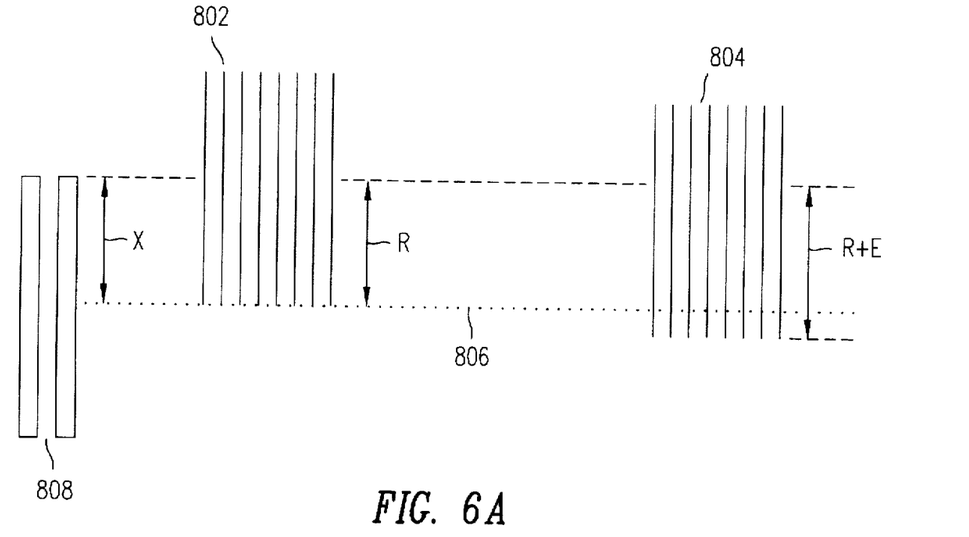
FIG. 6A is an illustration of a properly positioned product servopattern burst versus a radially offset burst.

FIG. 6A illustrates a properly positioned burst 802 and a mis-positioned burst 804 resulting from TMR. When centered on the desired propagation track a distance X from the preceding propagation track, the recording transducer 808 reads back a relative amplitude R for the properly positioned burst 802. Since this is the desired location, this relative amplitude equals the reference value, resulting in zero PES. However, the mis-positioned burst 804, having its edge shifted an amount E from the desired propagation track location 806 relative to the width of the transducer 808, results in a relative readback signal of R+E.

Figure 6B:
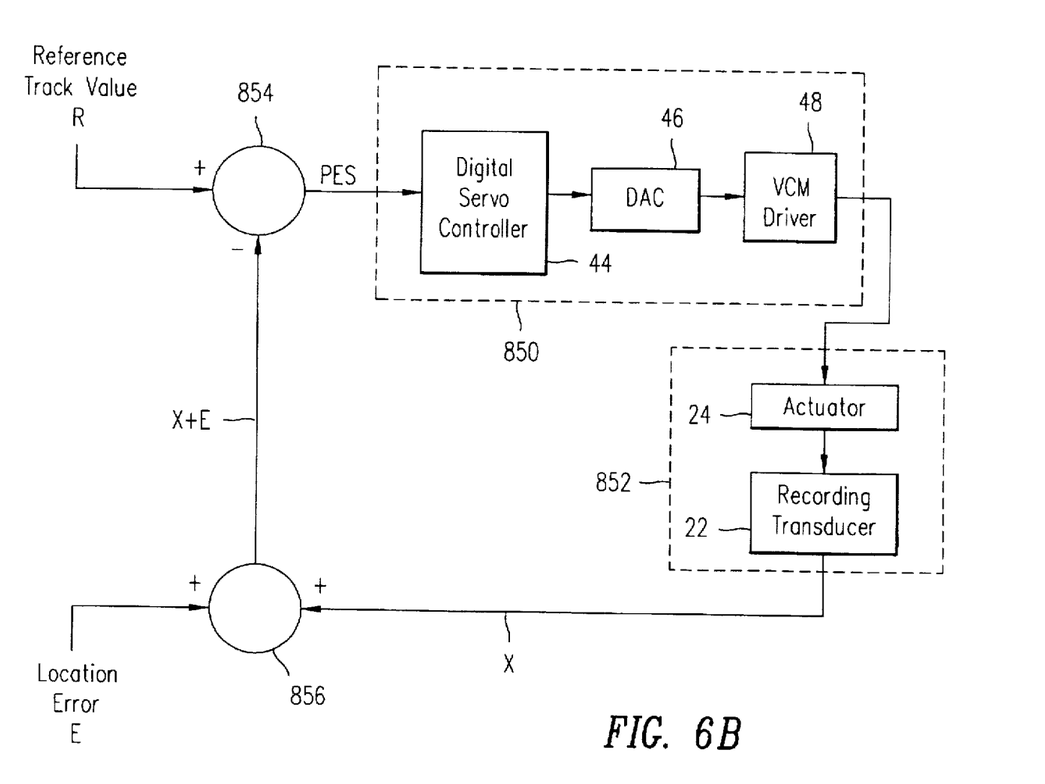
FIG. 6B is a control system diagram of a servo loop showing the manner in which the readback signals from the bursts in FIG. 8A are combined to form a position error signal suitable for practicing the present invention.

Referring now to FIG. 6B, a block diagram is shown of a servo control loop suitable for implementing the improved self-servowriting system of the present invention. Control systems are described generally in the book "Modern Control Engineering" by K. Ogata published by Prentiss-Hall corporation of Englewood Cliffs N.J. The loop controller 850 comprises digital servo controller 44, DAC 46, and VCM driver 48. The "plant" 852 comprises actuator 24 and recording transducer 22. The plant output X represents the absolute position of the recording transducer in units of relative head width. During self-propagation, the only observable signal is the position of transducer 22 relative to recording medium 26, but it is useful to consider the absolute position X for the purposes of analysis of servo loop performance. A loop summing point 856 is explicitly included to account for the relative nature of the observed position signal. Thus the observed position signal equals the sum of the absolute position X and the burst position error E. This signal X+E is combined at a standard loop reference summing point 854 with the reference value R to form the position error signal or PES. In usual fashion the sign shown next to the incoming arrows at a summing point represents a sign factor to apply to each signal before summing, hence the PES equals R−(X+E).

II. Measurement of Closed Loop System Response

II. A. Background Information

As described in copending application Ser. Nos. 08/349,028 and 08/405,261 now U.S. Pat. Nos. 5,612,833 and 5,659,436 the net effect of the written burst location errors is to produce a non-circular trajectory that the servo loop attempts to follow. Hence the errors act as an additional reference signal. The response to the non-circular trajectory is given by the closed loop response of the system. Normally, it is desired that the closed loop response of a servo loop be exactly equal to unity (in which case the controller gain would approach infinity). Such a system produces an output that exactly follows the desired trajectory and is infinitely stiff against disturbances.

In reality, only a finite controller gain can be used, and it must be frequency dependent to avoid loop instability arising from unavoidable phase shifts (i.e., positive feedback). In typical servo loop applications, including disk file actuator servos, the primary performance objective is to provide optimal rejection of mechanical disturbances within the constraints of a finite sampling rate, and the resulting closed loop response rises significantly above unity (1.5 or more) over a fairly broad range of frequencies. No drastic consequences arise from this approach during disk file operation.

In self-servowriting, however, the response to a non-circular trajectory at a given propagation track is reproduced in the writing of the next propagation track, and that response is reproduced yet again on the next propagation track. The closed loop response corresponds to a step-to-step error amplification factor, S, which will cause an error at one propagation track to appear N propagation tracks later as the error multiplied by the closed loop response raised to the Nth power. If the magnitude of the closed loop response exceeds unity, any error will grow indefinitely. On the other hand, if the closed loop response is less than unity, errors are still compounded, but the effect of an error at any one step eventually decays. Thus error compounding is effectively limited to a finite number of steps n.

As an example, consider a servo loop having a closed loop response of 0.99. N is approximately equal to unity divided by the amount by which the closed loop response differs from unity, i.e. n=1/(1−0.99)=100 in this case. Systematic errors such as written track width modulation will grow by about this factor n. Under these conditions, where the closed loop response is less than unity, track to track error is relatively small, and substantial growth can be tolerated without exceeding the absolute circularity limit of roughly one track spacing.

Viewed as a time waveform, the written burst location error trajectory is a perfectly repetitive function with a repeat frequency equal to the rotation frequency of the disk. A principle of Fourier analysis is that any such repetitive waveform has a frequency spectrum containing non-zero amplitudes only at the discrete set of frequencies corresponding to integer multiplies of the repeat frequency, in this case the disk rotation frequency. Thus, the relevant frequencies at which the closed loop response must be kept below unity are all integral multiples of the disk rotation frequency. As a frequency dependent quantity, the closed loop response C is actually a vector of complex numbers having both a magnitude and a phase, with each element of the vector corresponding to a particular multiple of the rotation frequency. It is the magnitude of each element of the vector that must be less than unity.

Choosing the servo loop parameters to ensure that the closed loop response is less than unity during writing is a simple method that provides a substantial reduction in random mechanical motion while ensuring that error growth is bounded. But the inclusion of correction values when computing new reference values in step 140 of FIG. 3A, alters the situation. As previously discussed, each new reference value is preferably set equal to a nominal average reference value plus a corrective value. Also previously noted, the corrective value may simply comprise a predetermined fraction, f, of the previously recorded PES value for the corresponding sector. According to this relatively straightforward approach, the PES readings are utilized directly as a time waveform. In this case, the step-to-step error amplification factor, S, no longer equals the closed loop response, C. Rather, it contains an additional correction factor, f, such that $S=C+f(1-C)$. Consequently, S must have a magnitude of less than unity at all integral multiples of the rotation frequency to assure bounded error growth.

In the formula above, S, like C, is a vector of complex elements, while f, being frequency independent and containing no phase shifts, is a single, real-valued term. It is not possible to find an f wherein the magnitude of every element of the vector S is less than unity, except for the special cases where the magnitude of all elements of C are all >1 or <1. Thus, calculating corrective values as a fraction of the previous PES values is useful in certain circumstances and offers the virtue of simplicity, but fails to provide a general capability of ensuring bounded error growth together with high gain servo performance in which the magnitude of C exceeds unity at some, but not all frequencies.

These shortcomings may be resolved by treating the vector of previously recorded PES values as a repetitive time waveform and by digitally filtering it to produce the reference table correction values. This method is equivalent to generalizing the factor f, such that it also becomes a vector with complex-valued elements. Many possibilities for a digital filtering algorithm exist, but one which provides total flexibility for choosing f at all necessary frequencies, i.e., multiples of the rotation frequency, is to compute the coefficients of the discrete Fourier transform of the waveform of PES values, multiply each by a complex-valued scale factor (the set of which comprise f), and then invert the transform using the scaled coefficients to produce a filtered time waveform. The new reference values are then computed by adding this filtered waveform to the nominal average reference value. A description of the discrete Fourier transform and the formulae associated with it can be found in "The Electrical Engineering Handbook" published by CRC Press of Boca Raton.

Rapid and efficient computation algorithms such as the Fast Fourier Transform may be used to perform the requisite calculations, but in practice it is found that only a limited number of frequency coefficients, corresponding to perhaps as many as the first 6 or 8 multiples of the rotation frequency, are usually required. To ensure bounded error growth, only frequencies at which the magnitude of the closed loop response exceeds unity need to be included. The factor f can equal zero for other frequencies, and corresponds to simply truncating the Fourier series transformations.

The filtering technique described above allows one to set specific values for the elements of S. The closed loop response may first be adjusted by means of the servo parameters to provide a desired level of mechanical disturbance rejection. Then, the appropriate values for f are computed using the formula $f=(S-C)/(1-C)$.

Unbounded growth of errors is avoided by keeping the magnitude of all elements of the vector S less than unity. In considering the growth of systematic errors such as write width modulation, the error in track shape levels off at a value equal to the base write width modulation times $(1+C-S)/(1-S)$, where the base write width modulation is the amount of track width modulation that occurs at each write step. The net track shape error is therefore very large if S is close to 1. Conversely, the cumulative effect of random mechanical motion is magnified if the step factor is chosen to be nearly zero, especially if C is close to 1. This occurs because the factor f itself becomes very large if C is close to 1.

A particular choice of S that has been found to give excellent results with the disk files studied so far is 0.9. This reflects the fact that it is more important to keep random errors small than it is to maintain absolute circularity of the tracks. Minimizing the write width modulation term reduces this effect and allows choices of S which optimize rejection of random mechanical motion. Other choices of step factor S, including complex-valued ones, may prove to be optimum depending on the details of the disk file heads, recording media, and mechanical properties.

II. B. Improved Closed Loop Measurements

The preceding discussion of closed loop parameters provides the background for a fourth improvement to the self-servowriting system. As described above, the correction factor f is represented by the relationship $f=(S-C)/(1-C)$. To calculate f, the system designer requires detailed knowledge of the closed loop transfer function. However, the plant of the servo system can vary over various points on the disk. Thus, the proposed improvement comprises determining S at the beginning of and at various points in the servowriting process. The various points correspond to a plurality of transducer locations in a radial location with respect to a disk surface, or transverse to linear tracks, e.g. in a tape drive. S is determined by measuring S itself or some other indicium or indicia of S such as the closed loop response or other servo system parameter observed to vary with S. If the measured indicium has varied more than an acceptable amount, e.g. as defined by a range of acceptable values for that indicium, one of two courses of action may then be taken: 1) either the f parameters are recalculated to maintain a desired value of S (preferably S<1); or 2) the closed loop response is adjusted to maintain a desired C, e.g. by adjusting the controller gain or other parameters in the feedback control loop. An example of the latter process in a proportional, integral, derivative (PID) type servo control loop would be to adjust the PID parameters. The latter approach is less desirable than the former, since it is dependent upon the plant. That is, $C=(Gp * Gc)/(1+Gc * Gp)$, where Gp is the gain of the plant, and Gc is the gain of the control. Thus plant gain may change beyond the range of adjustable control gain values required to maintain a desired closed loop value.

Figure 3C:
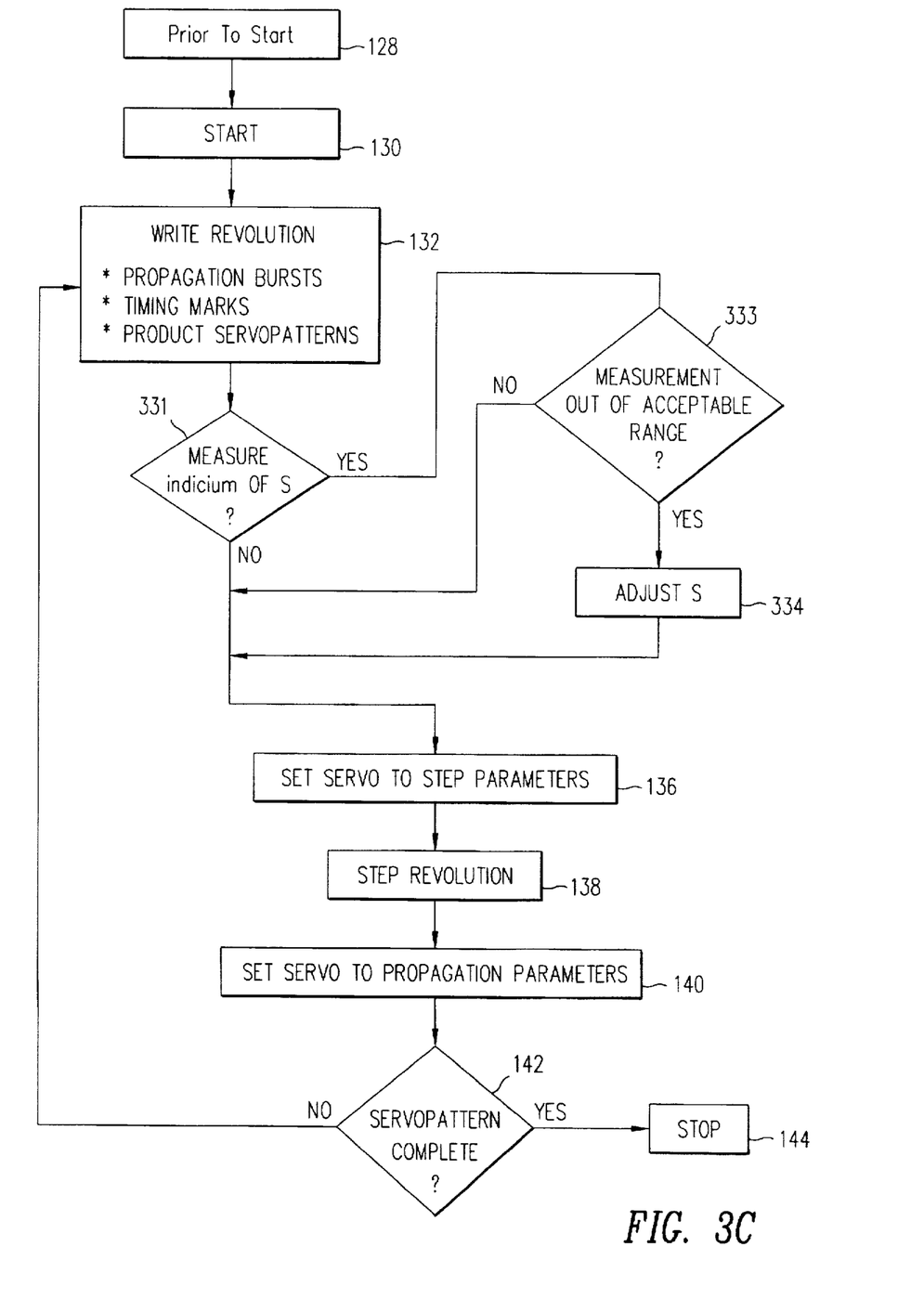
FIG. 3C is a flow diagram for a self-servowriting system incorporating the improvements of the present invention.

One implementation of the proposed invention is shown in the flow diagram of FIG. 3C. In this embodiment, an S determining step 333 is executed during certain iterations of the servowrite process as determined by decision step 331. If S or some other indicium or indicia of S (such as C) is determined to be within an acceptable range, no adjustment is made. If the indicium is out of range, however, a recalculation of the f values or readjustment of the closed loop response is executed as shown in step 334.

In a first embodiment, the readjustment is executed every Nth iteration of the process, where N is a fixed number or sequence of numbers stored, for example, in a register in memory 38, so that determinations of S are scheduled to occur at predetermined intervals. It was found that for a particular family of IBM Ultrastar 3.5" disk drives a fixed value of N=40 was satisfactory where C was the indicia.

Alternatively, frequency of measurements may be dynamically scheduled to occur only when an adjustment to maintain S is necessary, e.g. by monitoring some indicium or indicia of variations in S in the servo system. In circumstances where the closed loop variation with transducer position is unknown or erratic, the frequency at which measurements of the indicium of S are made is adjusted adaptively. For example, N is initially set to a default value such as 40, and is then increased or decreased by the processor 33 based upon the actual measured variation between successive measurements of the indicium. N is increased if the observed variation falls below a predetermined threshold value, and decreased if it rises above the same or another predetermined threshold value.

Competing considerations in selecting a particular implementation are the servowriting accuracy required and performance desired. For systems where the step factor amplification or indicia thereof has little variation with transducer position, indicia measurements will preferably be less frequent than for systems having substantial variation.

Referring back to FIG. 1, the preferred servo loop is implemented using a PID type servo controller comprising a personal computer 44 and a commercially available data acquisition plug-in board containing timing control circuitry 32, an ADC 36, and a DAC 46. Together with an amplitude demodulator 34, a VCM current driver 48, and a gated oscillator in pattern generator 30, the system is hooked up to a disk drive 20 and the six burst propagation sequence as described above (including the precision timing mark generation process together with a phase encoded servo pattern generator controlled by an additional computer) is carried out using various servo loop parameters. Such a system is suitable for use as an external servowriting system to be attached to the disk files through an electrical connector. Alternatively, the described functions are reduced to just a few integrated circuits to be included in every disk file for complete stand-alone self-servowriting.

In the described servo loop, the control voltage equals the sum of 1) a proportional value times the PES; 2) an integral value times the sum of all previous PES readings; and 3) a derivative value times the difference between the present PES and the PES from the preceding sector. These three values are examples of servo parameters that allow adjustment of the servo closed loop response (the ratio of the position signal response to a reference level modulation at a given frequency).

The closed loop response at any frequency is used as the indicia of S and is determined, for example, by applying a known reference level modulation at that frequency while measuring the position signal response at the same frequency. This is achievable without extra circuitry, since the computer that functions as the digital servo controller 44 has access to the real time position signal and has the capability of substituting sinusoidally modulated reference table values. By Fourier transforming a series of position signal readings obtained while applying a predetermined reference table modulation, the computer determines the magnitude and phase of the response. Alternatively, standard methods of servo loop analysis are used to calculate the closed loop response from a knowledge of the controller.

From the closed loop transfer function obtained, the reference values are recalculated to maintain the same values for the step factors S. Alternatively, the servo controller gain, Gc, is changed to maintain a desired closed loop transfer function given by Gc * Gp/ (1+GcGp).

As described so far, the correction terms used to compute new reference values involve only the PES waveform recorded during the preceding write revolution. It shall be understood, however, that other information available prior to stepping may also be included, such as accumulations of previous PES waveforms or even the PES waveform from the normalization revolution. Additionally, improved performance with regard to net track shape error and random track-to-track error may be achievable through more complex algorithms involving these additional terms. What is essential is that corrections to the reference values are based on data available prior to stepping to the new track location.

III. Conclusion

In summary, controlling the growth of errors is critical in a typical disk file requiring many thousands of steps to servowrite. Thus it is important to recognize that error growth is attributable to the special properties of servo loops as applied to a repetitive self-propagation process, and that such error growth may be remedied. Remedies include, for example, providing a desired closed loop response, e.g. by adjusting the servo control gains, or by providing desired step amplification factors, S, e.g. by digitally filtering the PES recorded during a write revolution to compute f values which assure that the step amplification factor does not exceed unity at any relevant frequency. The effectiveness of these remedies is further enhanced by the proposed improvement of periodically measuring an indicium or indicia of the step amplification factor, such as closed loop response, as the transducer moves transversely to the direction of the tracks. If S is determined to fall outside of an acceptable range, e.g. S<1, then the indicium or indicia of S, e.g. C or f values, are corrected to maintain S within an acceptable range. This improvement achieves substantial rejection of mechanical disturbances for greater track densities.

A number of specific embodiments have been described encompassing the present invention. Nevertheless, it will be understood that various modifications may become apparent to those having ordinary skill in the art of self servo propagation without departing from the spirit and the scope of the present invention. Accordingly, it is to be understood that the invention is not to be limited by the specific illustrated embodiments, but only by the scope of the appended claims.

What is claimed is:

1. In a system for writing a plurality of tracks of position information to a storage medium in a storage device, the position information being used by a servo system to position a transducer relative to the medium, the servo system having a step-to-step error amplification factor S which varies with transducer movement transverse to the direction of the tracks, a method for reducing propagation of track shape errors from one written track to the next, comprising the steps of:

for a plurality of transducer positions in a direction transverse to the track direction, determining S; and if S is not within a predefined range of values, adjusting S such that its value falls within the predefined range of values.

2. The method of claim 1, wherein S is determined by measuring an indicium of S.

3. The method of claim 2, wherein S is adjusted by adjusting the indicium of S to produce an S within the predefined range of values.

4. The method of claim 1, wherein the servo system has a closed loop response, C, and wherein S is determined by measuring C.

5. The method of claim 4, wherein S is adjusted by adjusting C to produce an S within the predefined range of values.

6. The method of claim 5, wherein C is adjusted by changing a servo parameter.

7. The method of claim 6, wherein the servo parameter comprises a servo controller gain.

8. The method of claim 6, wherein the servo parameter comprises a PID parameter.

9. The method of claim 1, wherein the servo system has a closed loop response, C, and a correction factor f, and wherein S is dependent on C and f.

10. The method of claim 9, wherein S is determined by first determining C and then determining S from C and f.

11. The method of claim 9, wherein S is adjusted by calculating a new f, such that f and C produce an S within the predefined range of values.

12. The method of claim 9, wherein f comprises a set of values.

13. The method of claim 12, wherein S is determined by first determining C and then determining S from C and at least one of the set of values f.

14. The method of claim 12, wherein S is adjusted by calculating a new set of f values, such that C and each f produce an S within the predefined range of values.

15. The method of claim 1, wherein the predefined range of values are each less than unity.

16. The method of claim 1, wherein the storage device comprises a disk drive.

17. The method of claim 1, wherein S is determined every Nth track during servowriting, where N is a fixed number.

18. The method of claim 1, wherein S is determined every Nth track, where the value of N is adjusted adaptively based upon at least one previously determined value of S.

19. The method of claim 18, further comprising the steps of setting N to a default value, determining first and second values of S at first and second transducer positions, and adjusting N based upon the difference between the first and second determined values of S.

20. The method of claim 19, wherein N is decreased if the difference falls below a threshold value.

21. The method of claim 19, wherein N is increased if the difference rises above a threshold value.

22. The method of claim 10, wherein C is a vector and is determined by applying a sinusoidally modulated reference value to the servo system at a fixed frequency while measuring the servo system response at the same frequency.

23. The method of claim 22, further comprising the step of Fourier transforming a plurality of position signal readings obtained while applying the modulated reference value to the servo system, to determine a magnitude and a phase of the response.

24. Apparatus for servowriting, comprising:

a storage medium for storing a plurality of tracks of information including position information, the position information;

a transducer capable of writing information, including the position information, to the storage medium;

a servo system responsive to position information on the storage medium for positioning the transducer relative to the tracks, the servo system having a step-to-step error amplification factor S which varies with transducer movement transverse to the direction of the tracks;

a measuring circuit including a processor to determine S, for a plurality of transducer positions in a direction transverse to the track direction, to determine if S is out of a predefined range of values; and an adjusting circuit coupled to the measuring circuit to adjust S such that an S having a value within the predefined range of values is produced.

25. The apparatus of claim 24, further comprising a proportional, integral, derivative (PID) type servo controller, a personal computer, and a data acquisition plug-in board.

26. The apparatus of claim 25, wherein the plug-in board further comprises timing control circuitry, an ADC, and a DAC.

27. The apparatus of claim 24, wherein the servo system further comprises an amplitude demodulator, a VCM current driver, and a gated oscillator, and wherein the servo system is coupled to a sealed storage device.

28. The apparatus of claim 24, wherein the storage medium comprises a recording disk.

29. The apparatus of claim 24, wherein the apparatus is substantially contained within a sealed storage device.

30. The apparatus of claim 29, wherein the storage device comprises a disk drive.

31. The apparatus of claim 24, wherein the measuring circuit determines S by measuring an indicium of S.

32. The apparatus of claim 31, the adjusting circuit adjusts S by adjusting the indicium of S to produce an S within the predefined range of values.

33. The apparatus of claim 24, wherein the servo system has a closed loop response, C, and wherein the measuring circuit determines S by measuring C.

34. The apparatus of claim 33, wherein the adjusting circuit adjusts S by adjusting C to produce an S within the predefined range of values.

35. The apparatus of claim 34, wherein the adjusting circuit adjusts C by changing a servo parameter.

36. The apparatus of claim 35, further comprising a servo controller coupled to the servo system, and wherein the servo parameter comprises a servo controller gain.

37. The apparatus of claim 36, wherein the servo controller comprises a PID, and wherein the servo parameter comprises a PID parameter.

38. The apparatus of claim 24, wherein the servo system has a closed loop response, C, and a track to track correction factor f, and wherein S is dependent on C and f.

39. The apparatus of claim 38, wherein the measuring circuit determines S by first measuring C and then determining S from C and f.

40. The apparatus of claim 38, wherein the adjusting circuit adjusts S by calculating a new f, such that f and C produce an S within the predefined range of values.

41. The apparatus of claim 38, wherein f comprises a set of values.

42. The apparatus of claim 41, wherein the measuring circuit determines S by first measuring C and then determining S from C and at least one of the set of values f.

43. The apparatus of claim 41, wherein the adjusting circuit adjusts S by calculating a new set of f values, such that C and each f produce an S within the predefined range of values.

44. The apparatus of claim 24, wherein the predefined range of values are each less than unity.

45. The apparatus of claim 24, wherein the storage device comprises a disk drive.

46. The apparatus of claim 24, wherein the measuring circuit determines S at every Nth track during servowriting, where N is a fixed number.

47. The apparatus of claim 24, wherein the measuring circuit determines S at every Nth track, where the value of N is adjusted adaptively based upon at least one previously determined value of S.

48. The apparatus of claim 47, wherein the measuring circuit further comprises a register for storing an initial value of N, a subtractor for calculating a difference between first and second determined values of N, and a processor coupled to the register and subtractor for adjusting N based upon the difference.

49. The apparatus of claim 48, wherein the processor decreases the value of N if the difference falls below a threshold value.

50. The apparatus of claim 48, wherein the processor increases the value of N if the difference rises above a threshold value.

51. The apparatus of claim 33, wherein C is a vector, wherein the measuring circuit further comprises a signal generator and a processor coupled to the servo system, and wherein C is measured by the signal generator applying a sinusoidally modulated reference value to the servo system at a fixed frequency while the processor measures the servo system response at the same frequency.

52. The apparatus of claim 51, wherein the processor measures the servo system response by receiving a plurality of position signal readings obtained while the modulated reference value is applied to the servo system, and determines a magnitude and phase of the response from a Fourier transform of the readings.

* * * * *